United States Patent [19]

Yant

[11] Patent Number: 4,566,568
[45] Date of Patent: Jan. 28, 1986

[54] STRUT SYNCHRONIZER FOR TRANSMISSIONS

[75] Inventor: Kenneth B. Yant, Oregon, Ohio

[73] Assignee: Dana Corporation, Toledo, Ohio

[21] Appl. No.: 508,796

[22] Filed: Jun. 28, 1983

[51] Int. Cl.⁴ .................. F16D 11/00; F16H 3/38
[52] U.S. Cl. ................................ 192/53 F; 74/339
[58] Field of Search ............ 74/339; 192/53 F, 53 E, 192/53 G, 53 B

[56] References Cited

U.S. PATENT DOCUMENTS

| | | | |
|---|---|---|---|
| 2,160,091 | 5/1939 | Simpson et al. | 192/53 |
| 2,221,894 | 11/1940 | White | 192/53 |
| 2,221,900 | 11/1940 | White et al. | 192/53 |
| 2,478,355 | 8/1949 | Auten | 192/53 F |
| 2,571,474 | 10/1951 | Ochs et al. | 192/53 F |
| 2,676,684 | 4/1954 | Armantrout | 192/53 F |
| 2,753,728 | 7/1956 | Kelbel | 74/359 |
| 3,197,000 | 7/1965 | Conkle | 192/53 F |
| 3,366,208 | 1/1968 | Kelbel | 192/53 F |
| 3,618,724 | 11/1971 | Oehl | 192/53 F |
| 3,620,338 | 11/1971 | Tomita et al. | 192/53 F |
| 3,631,952 | 1/1972 | Sugimoto et al. | 74/339 X |
| 4,132,298 | 1/1979 | F'Geppert | 192/53 B |
| 4,271,943 | 6/1981 | Kuzma | 192/53 F |
| 4,299,317 | 11/1981 | Katayama | 192/53 F |

FOREIGN PATENT DOCUMENTS 1555158  1/1971  Fed. Rep. of Germany .... 192/53 F

Primary Examiner—Lawrence J. Staab
Assistant Examiner—Stephen B. Andrews
Attorney, Agent, or Firm—Frank B. McDonald

[57] ABSTRACT

A transmission synchronizer includes a strut and blocker ring engagement system wherein the strut is retained by the blocker rings in all of its axial positions against centrifugal and spring forces on the strut. The slots in each blocker ring are fully enclosed, and thus are disposed for total containment of the opposed ends of the struts. In a preferred embodiment the strut includes a pair of opposed axially spaced, radially extending bearing surfaces, each disposed for axially bearing against one side of a blocker ring, wherein each of the bearing surfaces is distinct from the slot engaging ends of the strut. Thus each bearing surface defines an inwardly stepped wall relative to one of the slot engaging ends of the strut.

8 Claims, 3 Drawing Figures

STRUT SYNCHRONIZER FOR TRANSMISSIONS

BACKGROUND OF THE INVENTION

This invention relates to synchronizers for manual transmissions, and particularly to blocking synchronizers of the strut type.

Prior art manual transmissions have included strut synchronizers having many configurations. A principal drawback of strut synchronizers, however, has been their susceptibility to becoming dislodged by centrifugal forces acting on the strut body masses, particularly under conditions of overshifting. Additionally, the struts of the prior art occasionally become jammed with their interfacing parts, particularly with their associated blocker rings. Another drawback has been related to the mechanics of engagement of the male and female cones of the synchronizer mechanism. It will be appreciated by those skilled in the art that if the struts positioned about the circumference of the shifting sleeve carrier do not uniformly engage the blocker rings, a cocking of the blocker ring will result, creating accelerated wear of the synchronizer.

SUMMARY OF THE INVENTION

The synchronizer system of this invention prevents the dislodgement of strut members under centrifugal and spring forces, and also ensures that the struts are less susceptible to becoming jammed within the blocker rings. Moreover, the strut bodies of the present invention provide bearing surfaces apart from their opposed ends, a feature which promotes uniform engagement of the struts with respective blocker rings of the synchronizer, and thus prevents the undesirable cocking normally associated with non-uniform loading of the rings.

In a preferred form, the transmission synchronizer of the present invention includes a shifting sleeve which is non-rotatably mounted over a rotatable annular sleeve carrier. The carrier includes a plurality of radial notches in its outer circumference, and a pair of blocker rings are disposed on either side of the carrier. Each of the notches supports a strut axially engageable with the shifting sleeve. Hence the shifting sleeve effects axial movement of the strut into engaging relationship with either of the blocker rings. Each of the blocker rings includes a slot for receiving opposed ends of each strut, and each blocker ring slot is fully enclosed. As such, the strut ends are constrained and unable to be urged radially outwardly of the ring by centrifugal or spring forces. Finally, each strut carries a pair of opposed radially extending bearing surfaces, each of which is stepped axially inwardly relative to the opposed slot engaging ends of the struts.

DETAILED DESCRIPTION OF THE PREFERRED EMBODIMENT

Figure 1:
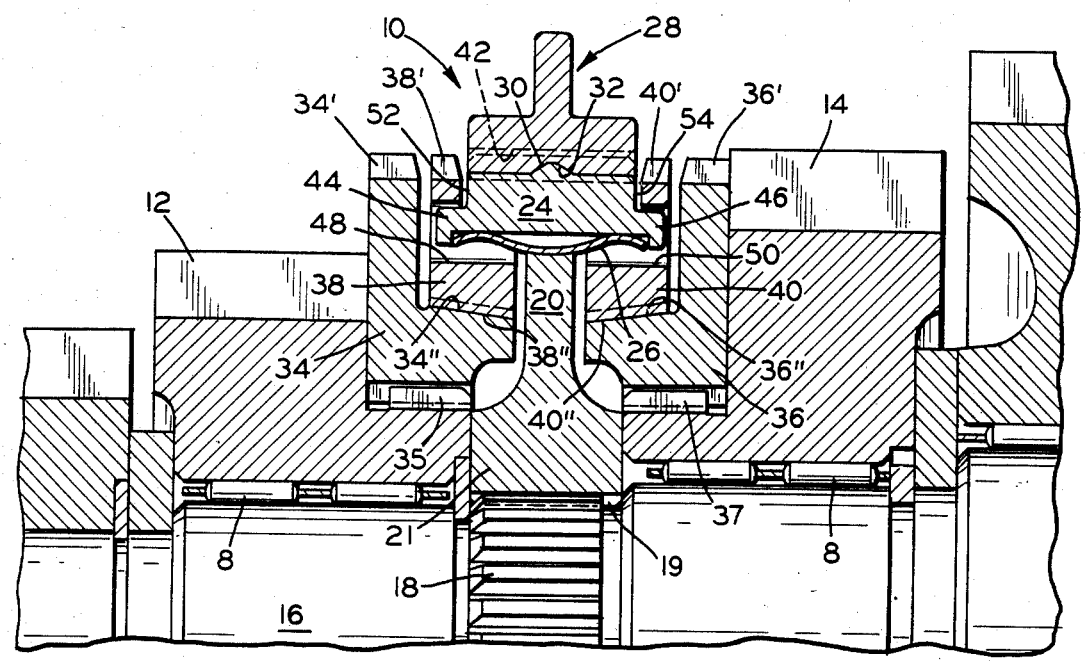
FIG. 1 is a fragmentary cross-sectional view of a portion of a manual transmission which includes a preferred embodiment of the synchronizer system of the present invention.

Referring first to FIG. 1, a manual transmission synchronizing device 10 is shown interposed between left and right transmissions gears 12 and 14, respectively. The device includes a shifting sleeve carrier 20, which includes a hub 21 splined to a transmission mainshaft shown fragmentarily at 16. Mainshaft splines 18 mate with carrier splines 19 to secure a non-rotatable connection between the shifting sleeve carrier 20 and the mainshaft 16.

Figure 2:
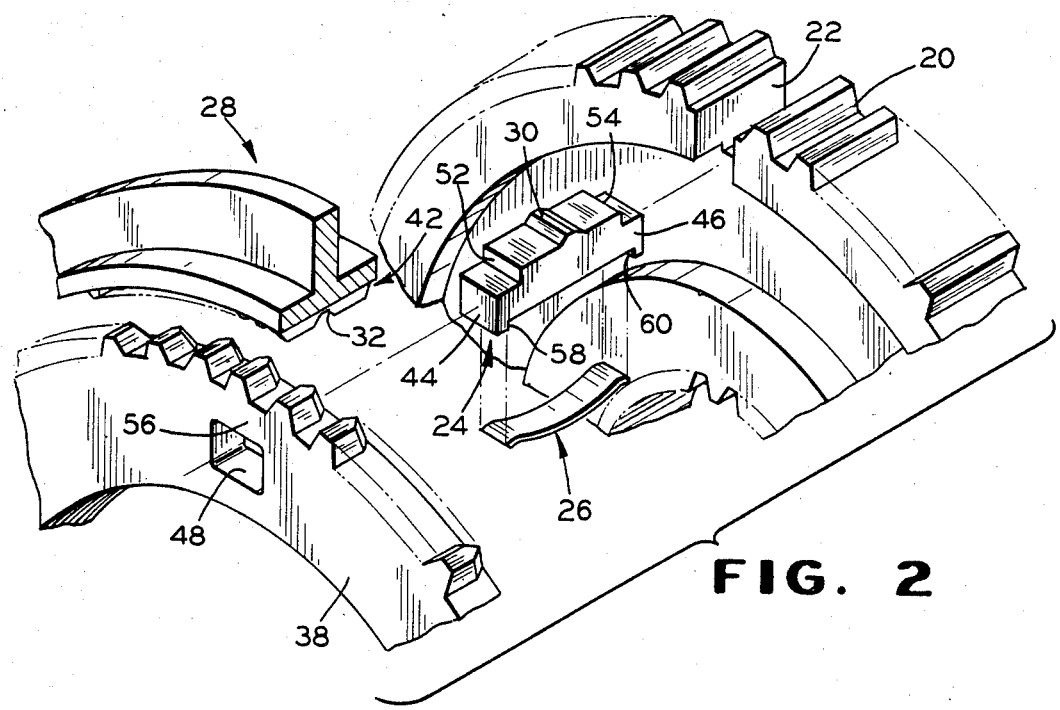
FIG. 2 is an exploded perspective view of the strut synchronizer system of FIG. 1.
Figure 3:
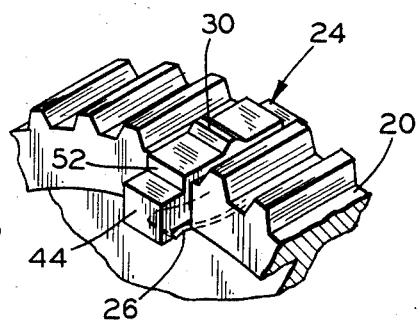
FIG. 3 is a perspective view of the strut and sleeve carrier parts as shown in FIG. 2, but in their relative operative positions.

Referring momentarily to FIGS. 2 and 3, the shifting sleeve carrier 20 includes a carrier slot 22 which in turn supports a strut 24. A shift collar 28 engages the strut by means of a detent 30 on the strut 24, wherein the detent 30 is received in a transversely extending detent receiving groove 32 positioned in the shift collar 28. As those skilled in the art will appreciate, the shift collar 28 may be alternatively moved axially to the left and to the right. The collar engages the strut 24 which, in turn by means hereinafter described, is effective to alternatively secure gear 12 or gear 14 against relative movement with respect to the carrier 20.

Referring now back to FIG. 1, positioned on either side of the sleeve carrier 20 are left and right synchronizer cones 34 and 36. The synchronizer cones are splined to gears 12 and 14, respectively, as shown at 35 and 37, and thus rotate with the latter individual gear members. Interposed between each synchronizer cone and the intermediately positioned sleeve carrier 20 are left and right synchronizer blocker rings 38 and 40. The blocker rings include indexing slots 48 and 50 (slot 48 is more clearly shown in FIG. 2), respectively, which receive left and right opposed ends 44 and 46 of the strut 24. In the preferred embodiment a plurality, such as 3 or 4, of the struts are employed about the circumference of the sleeve carrier member 20 in a plurality of slots 22. Each of the struts 24 include left and right bearing surfaces 52 and 54 which are radially disposed for contacting left and right blocker rings 38 and 40, respectively. The bearing surfaces 52 and 54 of the present invention are entirely separate and distinct from the opposed ends 44 and 46 of the strut members 24 to ensure greater engagement uniformity as will be hereinafter described.

Left and right ring synchronizer cones 34 and 36 include teeth 34' and 36', as well as cone surfaces 34" and 36". Left and right blocker rings 38 and 40 also include teeth 38' and 40', as well as cone surfaces 38" and 40". Thus, the male cone surface 34" of the left synchronizer cone 34 is disposed for mating with the female cone surface 38" of the left blocker ring 38, as the latter is urged leftwardly by the bearing surfaces 52 of the struts 24. Such leftward movement is achieved by leftward movement of the shift collar 28, which as previously mentioned will move the struts to engage the bearing surfaces thereof against the left blocker ring 38. Leftward movement of the left blocker ring 38 will in turn cause the female cone surface 38" to frictionally bear against the male cone surface 34" to stop relative rotation of the sleeve carrier 20 and the gear 12. Upon cessation of relative rotation between the latter members, the shift collar becomes free to slide leftwardly even further, causing an axially extending groove 42 therein to slide over the blocker teeth 38' and cone teeth 34' for selective lock-up of the gear 12. Alternatively, the shift collar 28 may be moved rightwardly, wherein a similar lock-up of gear 14 with respect to the sleeve carrier 20 may be effected.

Referring now particularly to FIGS. 2 and 3, it will be appreciated by those skilled in the art that the left and right blocker rings 38 and 40 include blocker ring slots 48 and 50 which are fully enclosed. Thus referring specifically to FIG. 2, the slot 48 is representative, and defines a full enclosure for retension of the opposed ends 44 of the struts 24. Thus each slot includes a radially outermost enclosure portion 56 which provides retention of the strut ends 44 against dislodgement from the blocker ring under all radially outward forces. It should be noted that in the preferred embodiment described, the dimensional tolerances will be controlled to ensure that the opposed ends 44 and 46 of the struts 24 will interlock both blocker rings 38 and 40 in all axial positions of the strut. Otherwise dislodgement of the strut ends may occur at the extreme strut positions. It will thus be appreciated by those skilled in the art that the enclosure portion 56 represents a solution to dislodgement under load, the latter having been a major deficiency of the prior art. Under the present invention, the struts will now be positively retained within their slots 22 even under conditions of extreme centrifugal and/or spring forces.

Referring now specifically to FIG. 3, the bearing surface 52 of one of the struts 24 is more particularly shown, with the strut positioned in its representative association with the sleeve carrier 20. It will be apparent that the bearing surface 52 is entirely distinct from the opposed end 44 of the strut 24. The separate bearing surface is less likely to become jammed to the extent that it is entirely outside of the slot 48 of the blocker ring 48. This aspect moreover represents a significant departure from the prior art, in that the opposed ends 44 and 46 which engage the slots of the blocker rings are thus not subjected to any axial loading, and hence are entirely free to carry only a transverse loading. This feature also insures against assymetric forces between the carrier 20 and rings 38 and 40, wherein the bearing surfaces 52,54 present a radial loading area entirely unencumbered by the non-planar coupling forces of the slot walls. A more uniform engagement of the blocker rings by the plurality of struts results, which prevents the aforementioned undesirable cocking of the ring.

The preferred embodiment of the present invention utilizes a spring 26, preferably of the leaf type, radially interposed between the carrier 20 and each strut 24. The ends of the spring are axially contained by a pair of radially inwardly extending, axially spaced left and right abutments 58 and 60 (FIG. 2) which are integral parts of the strut in the preferred embodiment. Those skilled in this art will appreciate that the spring provides both a mechanism for loading the strut and collar members 24 and 28 together, as well as a necessary cocking flexibility of the strut for uniform engagement thereof against the blocker rings. Alternatively, a coil spring may be utilized, even though the latter may be more expensive.

The above described presently preferred embodiment represents only one of many variations envisioned under the following claims.

What is claimed is:

1. In a transmission synchronizer including a shifting sleeve non-rotatably mounted over a rotatable annular sleeve carrier, said carrier having an axially extending notch in the outer circumference thereof, a pair of blocker rings disposed axially with respect to said carrier, a strut positioned within said notch, said strut engageable with said shifting sleeve for axial movement into engagement with one of said blocker rings, each ring including a slot for receiving an end of said strut; an improvement wherein said slot comprises a radially outermost enclosure portion for radial retension of said end of said strut under centrifugal forces, one of said blocker rings disposed on either side of said carrier, said strut containing a pair of slot engaging axially opposed ends, said strut further comprising a pair of axially opposed, radially extending bearing surfaces, each disposed for axially bearing against one side of one of said blocker rings, each of said bearing surfaces being axially spaced inwardly from and being separate and distinct from said slot engaging ends of said strut, each of said separate bearing surfaces being disposed only for engaging an outer radially extending surface of said blocker rings separate and apart from said slot.

2. The transmission synchronizer of claim 1 further comprising a pair of said blocker rings, one disposed on either side of said carrier, said strut containing a pair of slot engaging axially opposed ends, said strut further comprising a pair of axially opposed, radially extending bearing surfaces, each disposed for axially bearing against one side of one of said blocker rings, each of said bearing surfaces separate and distinct from said slot engaging ends of said strut.

3. The transmission synchronizer of claim 2 wherein said bearing surfaces define a pair of axially opposed walls on said strut, each of said walls being inwardly stepped relative to one of said slot engaging opposed ends of said strut.

4. The transmission synchronizer of claim 3 further comprising a spring disposed radially between said strut and said sleeve carrier, said slot engaging opposed ends of said strut defining radially inwardly extending axially spaced abutments for retaining said spring.

5. The transmission synchronizer of claim 4 wherein said slot engaging opposed ends of said strut interlock both of said blocker rings in all operative positions of said strut.

6. The transmission synchronizer of claim 5 wherein said spring is a leaf spring.

7. The transmission synchronizer of claim 6 wherein said radially outward forces comprise centrifugal and spring forces on said strut.

8. A transmission synchronizer comprising a shifting sleeve non-rotatably mounted over a rotatable annular sleeve carrier, said carrier having an axially extending notch in the outer circumference thereof, a pair of blocker rings disposed axially with respect to said carrier, one on either side of said carrier, a strut positioned within said notch, said strut axially engageable with said shifting sleeve for axial movement of said strut into engagement with either of said blocker rings, each of said rings including a slot for receiving respective slot engaging opposed ends of said strut, said strut comprising a pair of opposed axially spaced, radially extending bearing surfaces, each disposed for axially bearing against one side of one of said blocker rings, each of said bearing surfaces separate and distinct from said slot engaging ends of said strut, a leaf spring radially disposed between said strut and said sleeve carrier, said slot engaging ends of said strut defining radially inwardly extending axially spaced abutments for retaining said spring, wherein each of said bearing surfaces comprises an inwardly stepped wall relative to one of said respective slot engaging opposed ends of said strut, each slot comprising a radially outermost enclosure portion for containment and retension of said slot engaging end of said strut under centrifugal and spring forces on said strut, each of said separate bearing surfaces being disposed only for engaging an outer radially extending surface of one of said blocker rings, said radially extending surface being separate and apart from said slot.

* * * * *